United States Patent [19]

Attwood et al.

[11] 3,981,945

[45] Sept. 21, 1976

[54] COATING COMPOSITIONS COMPRISING A POLYSULFONE AND A FLUOROCARBON POLYMER

[75] Inventors: Terence Edwin Attwood, Kimpton; Barry William Farrant, St. Neots, both of England

[73] Assignee: Imperial Chemical Industries Limited, London, England

[22] Filed: Apr. 16, 1974

[21] Appl. No.: 461,408

[30] Foreign Application Priority Data

Nov. 19, 1973  United Kingdom............... 53583/73

[52] U.S. Cl. ........................... 260/900; 260/29.6 F; 260/29.6 NR; 260/30.8 R; 260/32.6 R; 427/318; 427/375; 428/35; 428/422
[51] Int. Cl.² ......................................... C08L 27/18
[58] Field of Search..................... 260/900; 428/422

[56] References Cited

UNITED STATES PATENTS

| | | | |
|---|---|---|---|
| 3,400,065 | 9/1968 | Barth .............................. | 204/159.2 |
| 3,432,468 | 3/1969 | Gabler ................................ | 260/47 |
| 3,442,825 | 5/1969 | Hodgdon et al. ..................... | 260/2.2 |
| 3,622,376 | 11/1971 | Tieszen et al. ...................... | 260/900 |

*Primary Examiner*—Carman J. Seccuro
*Attorney, Agent, or Firm*—Cushman, Darby & Cushman

[57] ABSTRACT

A coating composition is provided which comprises (a) 10% to 90% by weight of at least one thermoplastic aromatic polysulphones preferably having a reduced viscosity of at least 0.3 (measured at 25°C on a solution in dimethyl formamide containing 1 g of polymer in 100 cm³ of solution) and (b) 90% to 10% by weight of at least one fluorocarbon polymer.

9 Claims, No Drawings

COATING COMPOSITIONS COMPRISING A POLYSULFONE AND A FLUOROCARBON POLYMER

This invention relates to compositions and in particular to compositions comprising a thermoplastic aromatic polysulphone and a fluorocarbon polymer which are suitable for use as coatings.

According to the present invention a composition is provided which comprises (a) 10% to 90% by weight of at least one thermoplastic aromatic polysulphone and (b) 90% to 10% by weight of at least one fluorocarbon polymer.

Thermoplastic aromatic polysulphones and methods for making them are described in British patent specification Nos. 1,016,245; 1,060,546; 1,078,234; 1,109,842; 1,122,192; 1,124,200; 1,133,561; 1,153,035; 1,153,528; 1,163,332; 1,177,183; 1,234,301; 1,255,588; 1,265,144; 1,295,584; 1,296,383; 1,298,821 and 1,303,252; Belgian specification No. 741,965; Canadian specification No. 847,963; U.S. Pat. No. 3,432,468; Netherlands specification No. 69,03070; German specification No. 1,938,806 and Swiss specification No. 491,981, the disclosures of which are incorporated herein by reference.

The thermoplastic aromatic polysulphones described in the above mentioned specifications comprise repeating units of the formula

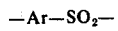

in which Ar is a bivalent aromatic radical which may vary from unit to unit in the polymer chain (so as to form copolymers of various kinds). Thermoplastic aromatic polysulphones generally have at least some units of the structure

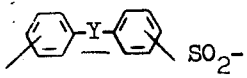

in which Y is oxygen or sulphur or the residue of an aromatic diol such as 4,4'-bisphenol. One commercially available example of such a polymer has repeating units of the formula

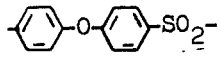

(Imperial Chemical Industries Limited) and others are said to have repeating units of the formula

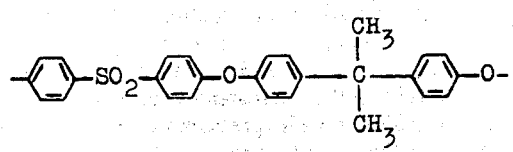

(Union Carbide Corporation) or copolymerised units in various proportions of the formulae

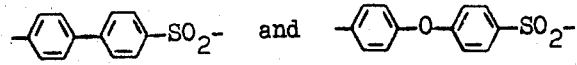

(Minnesota Mining and Manufacturing Company). Another group of such polymers has repeating units of the formula

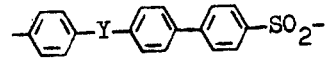

(where Y is oxygen or sulphur) which may be copolymerised with units of other formulae given above. Preferred such polymers have a reduced viscosity of at least 0.3 (as measured at 25°C on a solution of the polymer in dimethyl formamide containing 1 g of polymer in 100 cm³ of solution).

Compositions of the invention may include other components such as buffers, pigments and fillers such as graphite, and liquid compositions may also contain dispersing agents, emulsifiers and wetting agents.

The compositions of the present invention comprise 10% to 90% by weight of thermoplastic aromatic polysulphone, preferably more than 15% and less than 85% and desirably less than 60%.

By fluorocarbon polymers there are included polytetrafluoroethylene (PTFE) and copolymers of tetrafluoroethylene with up to 15% by weight of other monomers such as ethylene, vinyl chloride and hexafluoropropene. Preferred fluorocarbon polymers are polytetrafluoroethylene and copolymers of tetrafluoroethylene with up to 5%, especially 0.05 to 2% by weight of other monomers such as ethylene, vinyl chloride and hexafluoropropene.

Coating compositions of the present invention may be prepared for example by powder blending or by melting the polysulphone with fluorocarbon polymer powder or by adding fluorocarbon polymer powder to a solution of polysulphone to form a dispersion or by mixing aqueous or organic liquid dispersions of the polysulphone and fluorocarbon polymer. Most conveniently the coating composition is prepared as a dispersion. The solution of polysulphone can be formed from any convenient solvent such as for example dimethyl formamide, dialkyl or diaryl sulphones and sulphoxides including 1,1-dioxothiolan (sulpholane). An aqueous dispersion of polysulphone can be made for example by precipitation from solution, preferably from dilute solution or by ball milling polysulphone in powder or granular form with water in the presence of an emulsifier; ball-milling with water is preferred because it leads to polysulphone dispersion which has small particle size and from which removal of solvent is not necessary.

Compositions according to the invention may therefore be made by use of a dispersion of the fluorocarbon polymer in water which may be made by a polymerisation process in an aqueous medium or by dispersing a suitably finely divided solid form of the polymer in an aqueous medium.

In the preparation of aqueous dispersions of PTFE made by an aqueous polymerisation process, the tetrafluoroethylene is normally polymerised in the presence of an emulsifying agent, for example by the processes described in British patent specification Nos. 689,400 and 821,353. The emulsifying agent is preferably of the anionic type in the form of a fluorinated carboxylic acid compound such as ammonium perfluorooctanoate. For use in this invention, after polymerisation, the dispersion is further stabilised by means of a surfactant and, if necessary, concentrated. A suitable stabiliser is a non-ionic surfactant such as polyoxyethylated octyl phenol containing 1 or 9–10 moles of ethylene oxide per mole of octyl phenol sold by Rohm and Haas Company under the trademark "Triton" X15 and X100 respectively or a surfactant sold by Rohm and Haas Company under the trademark "Triton" DN65 and described by the suppliers as a modified ethoxylated straight chain alcohol.

Alternatively PTFE-containing aqueous compositions may be made by mixing a PTFE powder into an aqueous medium to form a dispersion which is then blended with the polysulphone or polysulphone dispersion. Alternatively they may be made by mixing the PTFE directly into an aqueous medium containing the polysulphone or into a solution containing polysulphone. A suitable comminution step may also be needed prior to or at the same time as the mixing takes place. The PTFE may be in the form of a lubricant grade powder. By the term lubricant grade PTFE powder we mean a PTFE powder of average particle size of less than 20 μm (as measured optically) that has been prepared by processes including comminution of a high molecular weight PTFE.

Examples of commercially available dry lubricant powders are 'Fluon' L169, L170 and L171 sold by Imperial Chemical Industries Limited. 'Fluon' L170 is a friable PTFE powder of 4 μm median particle size which can be broken down to smaller particle size (as low as 0.1 μm) when processed in various media e.g. by a high shear mixer. Thus 'Fluon' L170 may be added to aqueous medium and broken down by use of a high shear mixer to produce a colloidal dispersion of the polymer in the medium in which the polysulphone is already present or to which it is added subsequently.

The substrates to which the coating compositions are applied should be clean and free from grease and unles they have a fritted surface are preferably roughened, for example by abrading by grit blasting or by etching. Coatings may be applied by any of the conventional techniques, including spraying, dipping and brushing, followed if necessary by drying. The coating is then sintered conveniently in the presence of oxygen at temperatures of 330°C to 450°C; preferably 350°C to 400°C when the fluorocarbon polymer is a PTFE lubricant powder and preferably 380°C to 420°C when the fluorocarbon polymer in the composition is present as a dispersion.

The compositions of the present invention can be used in low friction coating applications where excellent performance is required, for example resistance to environmental high temperatures (e.g. more than 150°C) consistent with good adhesion to substrates.

Hence in accordance with a further aspect of the present invention, an article is provided coated with a composition derived by heating a mixture which comprises (a) 10% to 90% by weight of at least one thermoplastic aromatic polysulphone and (b) 90 to 10% by weight of at least one fluorocarbon polymer at a temperature of 330° to 450°C.

The compositions of the invention may be applied as coatings to a variety of substrates, including glass, e.g. for non-stick ovenware and non-stick autoclave linings; ceramics; composite surfaces such as a metal; metals such as ferrous metals, for example cast iron, mild steel, stainless steel, and aluminium and its alloys; and composite surfaces such as metals having a reinforcing coating, such as a sprayed ceramic and/or metal powder coating.

The compositions are particularly suited to coating cooking utensils, for example frying pans, saucepans and bakeware or for oven linings. In making cooking utensils, a blank may be coated and then formed, or an already formed utensil may be coated.

Compositions according to the invention may also be used to form adherent non-stick, low friction, coatings on many other articles including industrial processing equipment including moulds, rollers, stirrers, mixers, chutes, hoppers and heat sealing jaws, domestic articles such as iron sole plates, food mixers and ice separators and tools such as saw blades, electrical applications such as for example wire insulation.

The invention is illustrated by the following Examples.

EXAMPLE 1

A sample (24 g) of thermoplastic aromatic polysulphone having repeat units of the formula

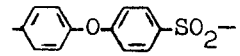

and a reduced viscosity of 0.42 (at 25°C on a solution of polymer in dimethyl formamide containing 1 g of polymer in 100 cm³ of solution) was dissovled in dimethyl formamide (139.6 g) by warming to 70°C in a sealed vessel. The solution was cooled to about 20°C and a non-ionic surfactant (6 g), "Triton" X100 was added with stirring. 'Fluon' L171 (24 g; PTFE lubricant powder of medium particle diameter 3–4 μm, as measured optically) was stirred into the solution. The mixture was stirred for 3 minutes on a Silverson mixer Model No. L2R using a screen having aperture diameter of ⅜ inch (1 cm) after which the screen was replaced by a screen having mean aperture diameter of one thirty-second inch (0.8 mm) and the mixture was stirred for a further 5 minutes. The speed of stirring was varied such that vigorous mixing was obtained without trapping air bubbles in the mix.

A portion of the mixture was spread onto a stainless steel "Hegman" gauge (a known apparatus allowing measurement of film thickness of a coating material), dried at 150°C for 15 minutes and sintered at 350°C for 30 minutes. Inspection of the coating showed that a thickness of 45 μm was obtained without mud-cracking. Coating thickness was assessed by "Permascope" (Helmut Fischer GmbH, Stuttgard, Germany).

Adhesion was assessed by spraying the mixture onto a plaque of aluminium (previously grit-blasted with 60 mesh alumina) which was then dried at 150°C for 15 minutes and sintered in air at 350°C for 15 minutes. A "Permascope" reading of the coated surface gave a reading of 36 μm. The adhesion was assessed according to the following tests:

1. By cutting through the coating and into the metal with a razor blade to give a cross-hatched pattern of cuts providing approximately 3 mm × 3 mm squares over an area of 625 mm². The adhesion of the coating is then assessed by firmly pressing a length of 25 mm wide, pressure-sensitive, adhesive tape over the cross-hatched area and subsequently pulling the tape sharply backwards at an angle of 45° to the direction of application. The application area is repeated with fresh tape until there is evidence that the coating is detaching from the metal or, if no failure is observed, up to a maximum of 15 times.

2. The cross-hatching procedure of test 1 was repeated and the test plaque was then immersed in a vegetable based cooking oil at 200°C for 3 hours. The adhesive tape test is carried out, after washing and drying the plaque, up to a maximum of 15 times.

In the case of the present example, no adhesion failure was seen after 15 applications of tape both before and after the hot oil test. A coating is regarded as showing satisfactory adhesion if it withstands more than 5 applications of tape.

EXAMPLE 2

A sample (30 g) of polysulphone described in Example 1 was milled with water (141 g) containing "Triton" DN65 (non-ionic emulsifier; 9 g) in a stainless steel ball mill for 7 days. The dispersion was removed from the mill and 154.7 g of dispersion was allowed to settle. After settling, 35 g of supernatant liquor was removed. The remaining dispersion was mixed with PTFE ('Fluon') L169B; 5.52 g) using a Silverson mixer. The resulting mixture contained 25% by weight solids and a PTFE:polysulphone ratio of 1.5:7, i.e. 17.6% by weight PTFE.

Two aluminum plates (one etched using caustic soda solution, the other grit blasted) were sprayed with portions of the above dispersion. The plates were dried in an air oven at 150°C for 15 minutes, then baked in air at 360°C for 15 minutes.

The resulting coatings were brown with good adhesion to the metal. Similar coatings but containing no polysulphone showed poor adhesion.

EXAMPLE 3

A portion of the mixture described in Example 1 was sprayed onto an aluminium plaque which had been degreased and etched in aqueous sodium hydroxide (10% by weight) for 10 minutes. The coating was dried at 150°C for 15 minutes and sintered in air at 350°C for 15 minutes. A "Permascope" reading of the coated surface showed that the coating had a thickness of 18 μm. No adhesion failure was seen after 15 applications of tape both before and after the hot oil test.

EXAMPLE 4

A sample of thermoplastic aromatic polysulphone having repeat units of the formula

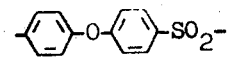

and a reduced viscosity of 0.49 (at 25°C on a solution of polymer in dimethyl formamide containing 1 g of polymer in 100 cm³ of solution) and 1.02 aromatically bound hydroxyl groups per 100 polymer repeat units was found to have particle size of 550 μm. The powder was subjected to fluid energy milling using a "Jet-o-Mizer" 0202 (Fluid Energy Processing and Equipment Company, Philadelphia, U.S.A.) and product therefrom found to have particle sizes 54.5 μm and 123 μm at feed rates of 2 kg/hour and 4 kg/hour respectively.

A portion (227.6 g) of the polysulphone having smaller particle size was milled with 946.4 g of an aqueous solution of "Triton" X100 (1.9% w/w) in a ceramic ball mill (5 dm³) for 178 hours to produce dispersion A (19.3% solids). The particle size of polymer in dispersion A was 14.5 μm whereas that of a similar aqueous dispersion but having 25% solids was 18.0 μm after 202 hours milling. A dispersion similar to dispersion A but produced by edge-roller milling was found to have particle size of 16.0 μm after 104 hours but evaporation losses had to be made up. Dry ball milling produced a powder having particle size of 45 μm. Particle size was determined using a Micromerograph, (Pennwalt Corporation, Pennsylvania, U.S.A.).

To a portion (200 g) of dispersion A were added 6.4 g of an aqueous solution of ammonium perfluorooctanoate (1.4% w/w) followed by PTFE (20.0 g; "Fluon" L171). The mixture was stirred for 3 minutes on a Silverson Mixer, Model No. L2R using a screen having aperture diameter of ⅜ inch (1 cm) after which the screen was replaced by a screen having mean aperture diameter of one thirty-second inch (0.8 mm) and the mixture was stirred for a further 1.5 minutes. The speed of stirring was varied such that vigorous mixing was obtained without trapping air bubbles in the mix.

A portion of the mixture was sprayed onto a plaque of aluminium (previously grit-blasted with 60 mesh alumina) and also onto a plaque of aluminium (previously etched for 10 minutes with 10% w/w aqueous sodium hyroxide). The coating was dried at 150°C for 15 minutes and sintered in air at 360°C for 15 minutes. Permascope readings of the coated surfaces gave 56 μm (for coating on the grit-blasted plaque) and 46 μm (for coating on the etched surface). No adhesion failure was observed after 15 applications of tape both before and after the hot oil test.

Eggs, hamburgers and pancakes could be successfully cooked on the coated surfaces of said plaques without sticking.

EXAMPLE 5

PTFE lubricant powder ('Fluon' L171, 24 g) was dispersed in a solution comprising "Triton" X100 (6.0 g) and dimethyl formamide (163.3 g) using a Silverson mixer Model No. L2R. A screen having aperture diameter of ⅜ inch (1 cm) was used for 3 minutes and then a screen having aperture diameter one thirty-second inch (0.8 mm) was used for 5 minutes. The PTFE separated from the dimethyl formamide solution unless frequently agitated.

The mixture was sprayed onto aluminium plaques one having been grit-blasted using alumina and the other having been degreased and etched for 10 minutes by aqueous sodium hydroxide (10% by weight). The PTFE tended to separate from the dimethyl formamide as it was sprayed onto the plaques. After drying both plaques at 150°C for 15 minutes and sintering in air at 350°C for 15 minutes, non-continuous coatings had been formed.

Adhesion testing was carried out as described in Example 1. Adhesion failure of the coating was noted after one application of the pressure sensitive tape in the case of the etched aluminium plaque and after two applications of the tape in the case of the grit-blasted aluminium plaque.

Test 2 of Example 1 was not carried out (i.e. immersion of the plaques in oil at 200°C for 3 hours) because of the poor adhesion.

We claim:
1. A coating composition which comprises a polymer mixture of (a) 10% to 90% by weight of at least one thermoplastic aromatic polysulphone having repeat units i) 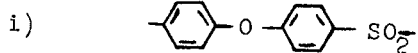

alone or in conjunction with repeat units selected from at least one of ii) 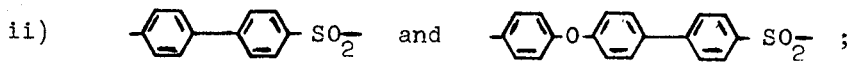

iii) 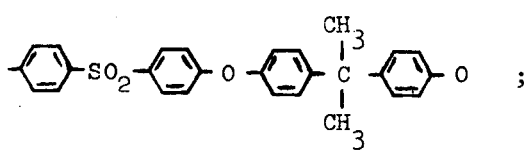

or repeat units (ii) or (iii) in conjunction with repeat units iv) 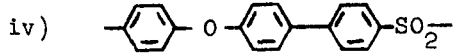

and, correspondingly, 90% to 10% by weight of at least one fluorocarbon polymer selected from polytetrafluoroethylene and copolymers of tetrafluoroethylene with up to 15% by weight of another unsaturated monomer, said composition being in the form of a dispersion of said fluorocarbon polymer dispersed in a solution of said thermoplastic aromatic polysulphone in a solvent therefor.

2. A composition according to claim 1 in which the concentration of thermoplastic aromatic polysulphone is 15% to 85% by weight.

3. A composition according to claim 2 in which the concentration of thermoplastic aromatic polysulphone is less than 60% by weight.

4. A composition according to claim 1 in which the fluorocarbon polymer is poly(tetrafluoroethylene).

5. A composition according to claim 1 in which the thermoplastic aromatic polysulphone has repeating units of the formula

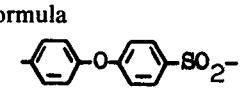

6. A method of coating an article which comprises applying to the article a composition as claimed in claim 1, drying the coated article, and sintering the coating at temperatures of 330°C to 450°C.

7. A cooking utensil coated by the method of claim 6.

8. A composition according to claim 4 in which the fluorocarbon polymer is a polytetrafluoroethylene powder of average particle size of less than 20 μm as measured optically prepared by a process including comminution of a high molecular weight polytetrafluoroethylene.

9. An article coated by the method of claim 6.

* * * * *

Notice of Adverse Decision in Interference

In Interference No. 99,537 involving Patent No. 3,981,945, T. E. Attwood and K. B. W. Farrant, COATING COMPOSITIONS COMPRISING A POLYSULFONE AND A FLUOROCARBON POLYMER, final judgment adverse to the patentees was rendered June 22, 1978, as to claims 1–4 and 6–9.

[*Official Gazette October 17, 1978.*]